United States Patent
Chen et al.

(10) Patent No.: US 10,831,446 B2
(45) Date of Patent: Nov. 10, 2020

(54) DIGITAL BIT-SERIAL MULTI-MULTIPLY-AND-ACCUMULATE COMPUTE IN MEMORY

(71) Applicant: Intel Corporation, Santa Clara, CA (US)

(72) Inventors: Gregory K. Chen, Portland, OR (US); Raghavan Kumar, Hillsboro, OR (US); Huseyin Ekin Sumbul, Portland, OR (US); Phil Knag, Hillsboro, OR (US); Ram Krishnamurthy, Portland, OR (US); Sasikanth Manipatruni, Portland, OR (US); Amrita Mathuriya, Portland, OR (US); Abhishek Sharma, Hillsboro, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 16/145,569

(22) Filed: Sep. 28, 2018

(65) Prior Publication Data

US 2019/0065151 A1    Feb. 28, 2019

(51) Int. Cl.
| | |
|---|---|
| G06F 7/544 | (2006.01) |
| G06F 17/16 | (2006.01) |
| G06F 7/501 | (2006.01) |
| G06F 9/30 | (2018.01) |
| G06N 3/04 | (2006.01) |
| G06N 3/063 | (2006.01) |

(52) U.S. Cl.
CPC .......... *G06F 7/5443* (2013.01); *G06F 7/5016* (2013.01); *G06F 9/3001* (2013.01); *G06F 17/16* (2013.01); *G06N 3/0481* (2013.01); *G06N 3/063* (2013.01)

(58) Field of Classification Search
CPC .... G06F 7/5443; G06F 7/5016; G06F 9/3001; G06F 17/16; G06F 3/0481; G06N 3/063
USPC .................................................. 708/501, 707
See application file for complete search history.

(56) References Cited

U.S. PATENT DOCUMENTS

| | | | | | |
|---|---|---|---|---|---|
| 2,719,670 | A | * | 10/1955 | Jacobs .................. | G06F 7/5272 708/707 |
| 2,808,204 | A | * | 10/1957 | Geyer ..................... | G06F 7/501 708/707 |
| 3,098,153 | A | * | 7/1963 | Heijn .................... | G06F 7/5016 708/707 |

(Continued)

OTHER PUBLICATIONS

"Analog Multipliers," Analog Devices MT-079 Tutorial, 8 pages.

(Continued)

*Primary Examiner* — Tan V Mai
(74) *Attorney, Agent, or Firm* — Compass IP Law, PC (57) ABSTRACT

A memory device that includes a plurality subarrays of memory cells to store static weights and a plurality of digital full-adder circuits between subarrays of memory cells is provided. The digital full-adder circuit in the memory device eliminates the need to move data from a memory device to a processor to perform machine learning calculations. Rows of full-adder circuits are distributed between sub-arrays of memory cells to increase the effective memory bandwidth and reduce the time to perform matrix-vector multiplications in the memory device by performing bit-serial dot-product primitives in the form of accumulating m 1-bit×n-bit multiplications.

20 Claims, 8 Drawing Sheets

(56) References Cited

U.S. PATENT DOCUMENTS

| | | | | |
|---|---|---|---|---|
| 5,379,257 | A * | 1/1995 | Matsumura | G11C 7/1006 |
| | | | | 365/189.011 |
| 2003/0006364 | A1* | 1/2003 | Katzir | G01N 21/8851 |
| | | | | 250/208.1 |
| 2005/0195680 | A1* | 9/2005 | Higashi | G11C 8/08 |
| | | | | 365/236 |

OTHER PUBLICATIONS

Allen, "Lecture 110—Phase Frequency Detectors," ECE 6440-Frequency Synthesizers, Jun. 9, 2003, 18 pages.

Ambrogio, S., et al., "Equivalent-Accuracy Accelerated Neural-Network Training Using Analogue Memory," Nature, vol. 558, Jun. 7, 2018, 22 pages.

Biswas, A., et al., "A 42pJ/decision 3.12TOPS/W Robust In-Memory Machine Learning Classifier With On-Chip Training," 2018 IEEE International Solid-State Circuits Conference—(ISSCC), San Francisco, CA, 2018, pp. 488-490.

Fick, D., et al., "Analog Computation in Flash Memory for Datacenter-Scale AI Inference in a Small Chip", 2.05 Mythic Hot Chips, 2018, 28 pages.

Gonugondla, S.K., et al., "A 42pJ/decision 3.12TOPS/W Robust In-Memory Machine Learning Classifier With On-Chip Training," 2018 IEEE International Solid—State Circuits Conference—(ISSCC), San Francisco, CA, 2018, pp. 490-492.

Han, et al, "CMOS Transconductance Multipliers: A Tutorial," IEEE Transactions on Circuits and Systems—II: Analog and Digital Signal Processing, vol. 45, No. 12, Dec. 1998.

Henzler, S., "Chapter 2, Time-to-Digital Converter Basics", Springer Series in Advanced Microelectronics 29, 2, Springer Science+Business Media B.V. 2010.

Kang, M., et al., "An In-Memory VLSI Architecture for Convolutional Neural Networks", http://ieee-cas.org/pubs/jetcas, Published Version DOI: 10.1109/JETCAS.2018.2829522, Publication Apr. 23, 2018, IEEE Circuits and Systems Society, 13 pages.

Mason, A., "Memory Basics", Michigan State, ECE 410, Chapter 13 Lecture Notes, pp. 13.1-13.34, 2010.

Solanki, Umang, "How does SRAM work?", https://www.quora.com/How-does-SRAM-work, Aug. 17, 2017, 2 pages.

Stone, Harold S. "A Logic-In-Memory Computer", IEEE Transactions on Computers, Jan. 1970, 6, pages.

Zhang, J., et al., "In-Memory Computation of a Machine-Learning Classifier in a Standard 6T SRAM Array," In IEEE Journal of Solid-State Circuits, vol. 52, No. 4, 10 pages, Apr. 2017.

* cited by examiner

DIGITAL BIT-SERIAL MULTI-MULTIPLY-AND-ACCUMULATE COMPUTE IN MEMORY

FIELD

This disclosure relates to machine learning and in particular to compute in memory.

BACKGROUND

Deep learning is an approach to artificial intelligence using neural networks. A neural network has a plurality of interconnected processing nodes that provide a means for performing machine learning by analyzing examples. For example, an object recognition system may analyze thousands of images of objects (for example, trucks) so that it can learn to find visual patterns in an image to identify the object.

Neural networks may be organized into layers of nodes, and data may move through the neural network in only one direction. An individual node may be connected to several nodes in the layer beneath it, from which it receives data, and several nodes in the layer above it, to which it sends data.

A node assigns a number known as a "weight" to the connection in the neural network. When the neural network is active, the node receives a data item (number) from its connections and multiplies it by the associated weight. The node then adds the resulting products together, yielding a single result (number). If the result is below a threshold value, the node does not forward the result to the next layer. If the number exceeds the threshold value, the node forwards the result (the sum of the products) to the outgoing connections of the node.

In a deep learning system, a neural network model is stored in memory and computational logic in a processor performs multiply-accumulate (MAC) computations on the parameters (for example, weights) stored in the memory. Data transfer between memory and the processor is an energy-intensive process and can consume up to 90% of the power in machine learning workloads.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

A multiply-accumulate (MAC) operation computes the product of two numbers and adds the product to an accumulator. A processor may contain MAC computational hardware logic that includes a multiplier implemented in combinational logic followed by an adder and an accumulator register that stores the result. The output of the accumulator register may be fed back to one input of the adder, so that on each clock cycle, the output of the multiplier is added to the accumulator register.

A traditional computing architecture, known as a von Neumann architecture, software requires data transfers between separate computational logic in a processor (for example a Central Processing Unit (CPU)) and memory. The von Neumann architecture creates a bottleneck for machine-learning applications that require many data transfers between the processor and memory. In addition, data transfer between memory and the processor is an energy-intensive process.

Compute in memory (CIM) both reduces the energy for data movement between memory and the computational logic in the processor, and also increases the effective memory bandwidth by extracting data from a greater portion of the stored data. For example, analog CIM increases computation throughput by reading data (weights) stored in multiple rows of memory and using current summing or charge sharing to extract only the MAC result, instead of the raw data as stored in the memory. However, analog CIM suffers from low precision because of voltage headroom, and yields non-deterministic results because of low noise margins and high process, voltage, and temperature variations.

The majority (for example, up to 99%) of calculations for machine learning applications are MAC operations. In an embodiment, a memory device includes a plurality of sub-arrays of memory cells to store weights and a plurality of digital full-adder circuits between the subarrays of memory cells. The digital full-adder circuit in the memory device eliminates the need to move data from the memory device to a processor to perform machine learning calculations (for example, MAC operations). Rows of full-adder circuits are distributed between sub-arrays of memory cells to increase the effective memory bandwidth and reduce the time to perform matrix-vector multiplications in the memory device by performing bit-serial dot-product primitives in the form of accumulating m 1-bit x n-bit multiplications.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
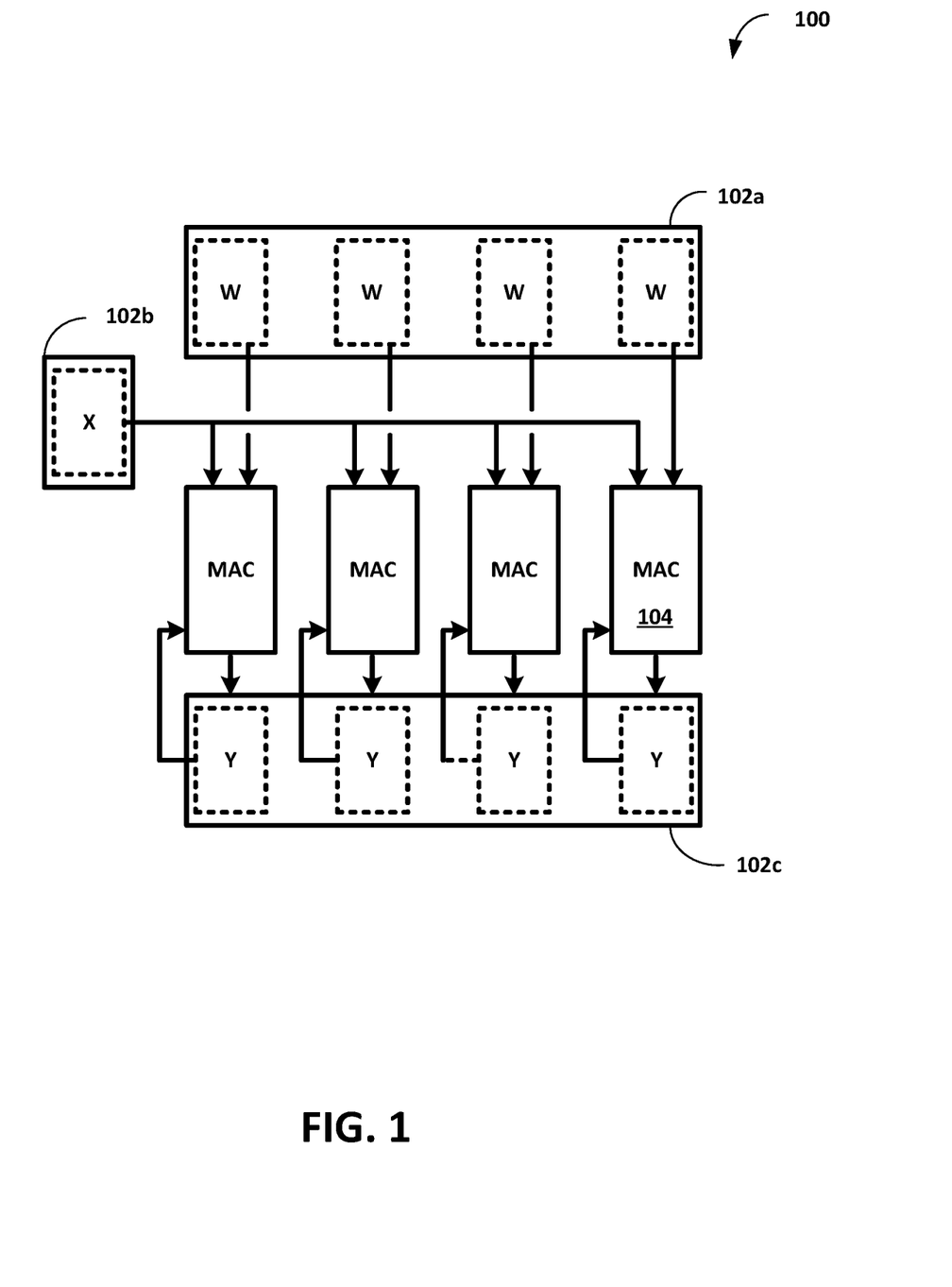
FIG. 1 is a block diagram of a circuit 100 that includes Multiply and Accumulate (MAC) units and a memory to store a weight matrix W, a column vector X, and a column vector Y.

FIG. 1 is a block diagram of a circuit 100 that includes Multiply and Accumulate (MAC) units 104 and a memory 102 to store a weight matrix W, a column vector X, and a column vector Y. A matrix is an array of numbers arranged in rows and columns. A column vector is an m×1 matrix consisting of a single column of m elements. A row vector is a 1×m matrix consisting of a single row of m elements.

The plurality of MAC units 104 compute the dot product WX=Y. A dot product is the sum of the products of corresponding entries of two sequences of numbers. In the circuit shown in FIG. 1, the weight matrix (W) is a 4 (row elements)×4 (column elements) matrix, the column vector X has 4 elements and the column vector Y has 4 elements. The equation below describes the dot product WX=Y performed by the circuit in FIG. 1.

$$\begin{bmatrix} W_{00} & W_{10} & W_{20} & W_{30} \\ W_{01} & W_{11} & W_{21} & W_{31} \\ W_{02} & W_{12} & W_{22} & W_{32} \\ W_{03} & W_{13} & W_{23} & W_{33} \end{bmatrix} \begin{bmatrix} X_0 \\ X_1 \\ X_2 \\ X_3 \end{bmatrix} = \begin{bmatrix} Y_0 \\ Y_1 \\ Y_2 \\ Y_3 \end{bmatrix}$$

Pseudo-code for the matrix multiply operation for a 4×4 weight matrix (W[i,j]), 1×4 row column (X[i]) and 1×4 row column (Y[j]), is shown below.

```
for j (0-3):
    for i (0-3):
        Y[j] += W[i,j] * X[i]
```

Each cycle (iteration) one row of elements from the weight matrix W stored in SRAM 100a (for example, in the first cycle for j=0, elements $W_{00}$ $W_{10}$ $W_{20}$ $W_{30}$ in the first row) and one element in column vector X (for example, in the first cycle, element $X_0$) stored in SRAM 100b are input to a plurality of MAC units. Each MAC unit 104 includes a one-element multiplier circuit and an accumulator circuit. The one-element multiplier circuit computes W[i,j]*X[i]. The partial sums from each one-element multiplier circuit are accumulated (Y[j]+=W[i,j]*X[i]) and the final partial sums of the 4×4 element matrix (W)—column vector X multiplication are written into the Y column vector ($Y_0$ $Y_1$ $Y_2$ $Y_3$) in SRAM 100c.

In an embodiment, W may be a 32×32 element matrix with each element having 8-bits. X may be a column vector with 32 elements with each element in the column having 8-bits. Y may be a column vector with 32 elements with each element in the column having 16-bits. W and X may be stored in a 1024×256-bit Static Random Access Memory (SRAM), and Y may be stored in a 1024×512-bit SRAM.

Figure 2:
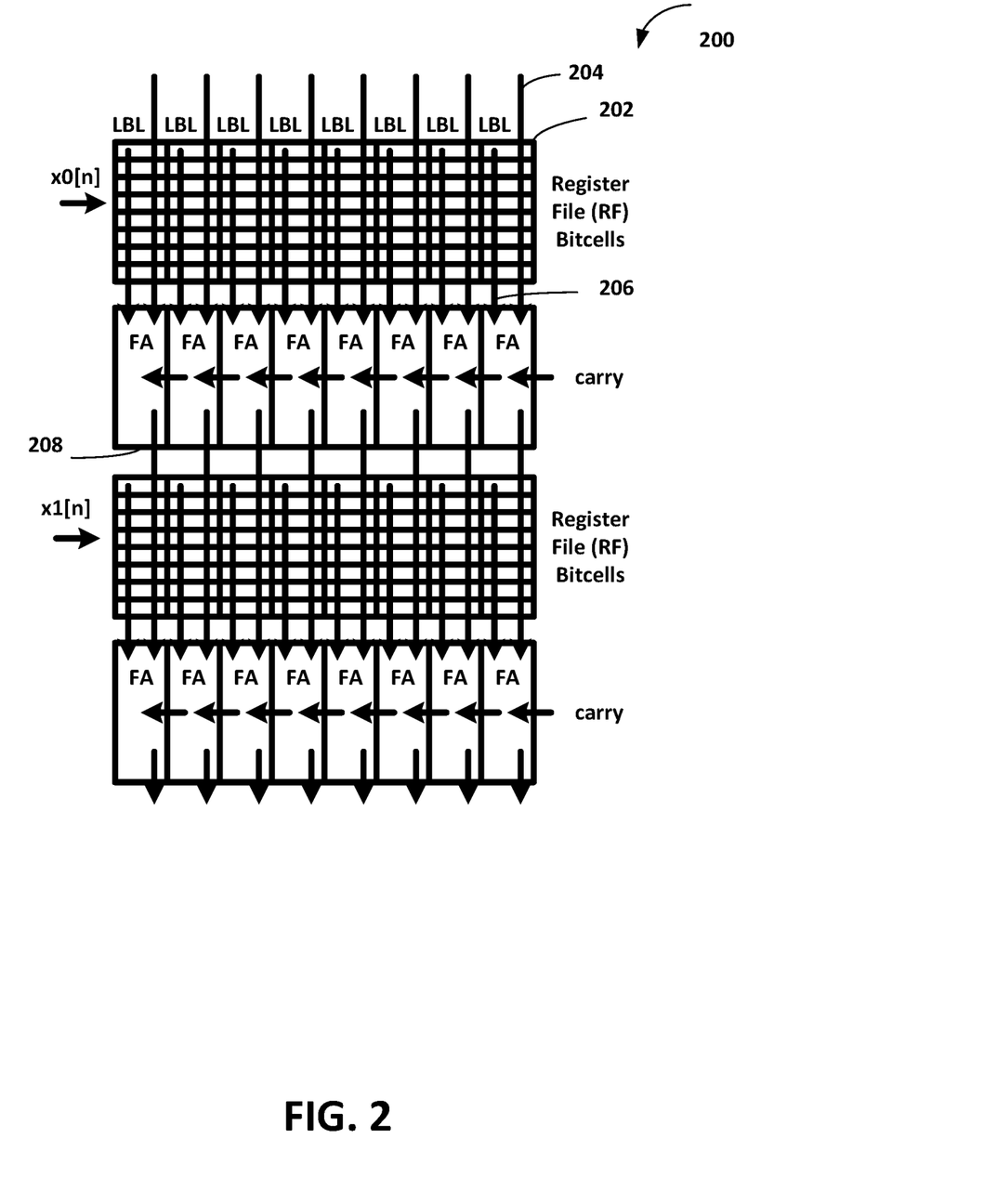
FIG. 2 is an embodiment of a memory device that includes digital full-adder circuits between sub-arrays of memory cells.

FIG. 2 is an embodiment of a memory device that includes digital full-adder circuits 208 between sub-arrays of memory cells 202. In contrast to circuit 100, that includes a SRAM device 102a, 102b, 102c to store weights and a separate MAC unit 104, the SRAM device includes rows of digital full-adder circuits 208 between sub-arrays of memory cells 202 in the memory 200. In an embodiment, weights (W) are stored in a sub-array of memory cells 202 which are implemented as Register File (RF) bitcells. Each output of an RF bit-cell is a full-swing logic level that can be input directly to the digital full-adder circuits 208. A pitch matched row of digital full-adder circuits 208 is inserted between sub-arrays of memory cells 202 connected on a Local Bit Line (LBL) 206. An embodiment of a digital full-adder circuit 208 will be described later in conjunction with FIG. 6.

In the embodiment shown, the sub-array of memory cells 202 is a sub-array of RF bit cells in a Static Random Access Memory (SRAM) and each Static Random Access Memory cell in the sub-array of memory cells 202 has eight transistors (an eight transistor (8T) SRAM cell). SRAM is a volatile memory that uses bistable latching circuitry to store a bit. The value driven onto the local bit line (LBL) 206 by the 8T SRAM cell is full-swing and can be directly input into a full-adder cell in the digital full-adder circuits 208. An embodiment of an 8T SRAM cell will be described later in conjunction with FIG. 4.

Referring to FIG. 2, the matrix multiplication of a m×m elements matrix storing weight elements W with a 1×m elements input activation vector X is performed in SRAM. The m elements in input activation vector X are denoted as {x0, x1, ... xm}. Each element in input activation vector X has n-bits denoted as x0={x0[n−1], ... x0[1], x0[0]}. Each element in the matrix has n-bits.

Between the rows of digital full-adder circuits 208 are sub-arrays of memory cells 202 storing weight (W) values. The values of weight (W) elements in the m×m matrix are written to the sub-array of memory cells 202 prior to the start of the compute in memory operation and are static during the compute in memory operation. Output activation vector Y may be a column vector with m elements with each element in the column having 2n-bits. In an embodiment, m is 32 and n is 8-bits.

A row in the sub-array of memory cells 202, which may also be referred to as a word line, is conditionally read dependent on the state of the one-bit of the input activation vector element for the row, for example, if (x0[n]) is logical '1', the row is read, if (x0[n]) is logical '0', the row is not read. Multiplication of the input activation vector element for one of the plurality of word lines and a weight stored in the sub-array of memory cells is computed through access to the sub-array of memory cells 202.

The data that is read from the row in the sub-array of memory cells 202 and subsequent addition with a row of digital full-adder circuits 208 implements the multiplication of the one-bit of the input activation vector element X and the n-bit weight accessed from the row in the sub-array of memory cells 202. Partial sums are generated by conditionally accessing the weight (w0[n], . . . w0[0]) stored in the sub-arrays of memory cells 202 based on the one-bit activation value from the input activation vector X (that is, the state of X[n]).

In an embodiment, in which n is 7, there are eight sub-arrays of memory cells 202 implemented as a plurality of Register Files (RF) with each RF storing m-bits. A RF is accessed if the state of the respective one of eight bits in X[n] is logical '1' and the value stored in the RF is passed on the local bit lines (LBL) 206. If the respective one of eight bits in X[n] is logical '0', the weight stored in a register file cell is not passed on local bit line (LBL) 206. One or more of the partial sums from each row (RF) in the sub-array of memory cells 202 are passed on the local bit lines (LBL) 206 in the sub-array of memory cells 202 to a row of digital full-adder circuits 208 which complete the multiply and accumulation operation. The result of the multiply and accumulation for x0[n] and W is passed downward on global bit lines (GBL) 204 to be accumulated with the multiplication of the next input activation vector element (x1[n]) in the input activation vector X with W.

Multiple multiply and accumulate operations are performed in one cycle with m accumulations of 1-bit x n-bit multiplications performed using a structure that is similar to an array multiplier. The results of multiple m×1-bit x n-bit multiply and accumulate operations are shifted and accumulated using digital full-adder circuits 208.

Thus, the latency of the matrix multiplication is a function of the input activation bit precision and cycle time is based on the number of elements accumulated. The sum of products with 1 bit activations with n-bit weights repeat for higher activation precision. Computations with higher precision activation values can be performed using the bit-serial computations. The latency for the partial sum is a function of the precision, for example, 8 (8-bit element) instead of a function of the number of elements to accumulate for example, 32 (32 elements in the matrix and input activation vector). The pseudo-code for the bit-serial matrix multiplication performed in memory 200 to compute the dot product WX=Y, with weight matrix W, input activation vector X, and output activation vector Y is shown below. In the example described in conjunction with FIG. 2, x-precision is 8 bits, y_len is 32 elements, and x_len is 32 elements.

```
for bit in range(x_precision):
    for j in range(y_len):
        for i in range (x_len):
            Y[j] += W[i,j] * X[i][bit] << bit
```

For the example, in which X has 8 elements and W is a 32-element by 32 bit element matrix with each element having 8 bits, 32 1-bit×8-bit partial sums are accumulated in one cycle. The latency for matrix multiply is 8 cycles which is a function of the input activation vector X. The latency is 32 cycles which is a function of the number of accumulated multiplications for 32 elements.

The bit-serial matrix multiplication performed in memory 200 described in conjunction with FIG. 2 achieves 75% higher energy efficiency than the circuit described in conjunction with FIG. 1 at 6.64 TOPS/W in the same area. Tera Operations Per Second (TOPS) is a common performance metric. TOPS per watt (TOPS/W) extends that measurement to describe performance efficiency. Higher TOPS/W systems produce less heat, are easier and less expensive to cool and consume less power.

A matrix multiplication of a n-bit element with a n-bit element results in a 2n-bit result and a potential 2n+1 carry bit. The bit precision of the result can be improved by processing the additional 2n+1 carry bit. In one embodiment, the bit precision of the output activation vector Y is performed by increasing the number of columns in the sub-array of memory cells 202 and digital full-adder circuits 208 to 2n, accessing alternating sets of n columns and using the un-accessed n full-adders to process the overflow (n+1) in the output activation calculations. In another embodiment, additional logic is added to the memory 200 to handle the carry bit. In yet another embodiment, an additional bit (2n+1) is added to the output activation vector Y to store the additional carry bit.

Figure 3:
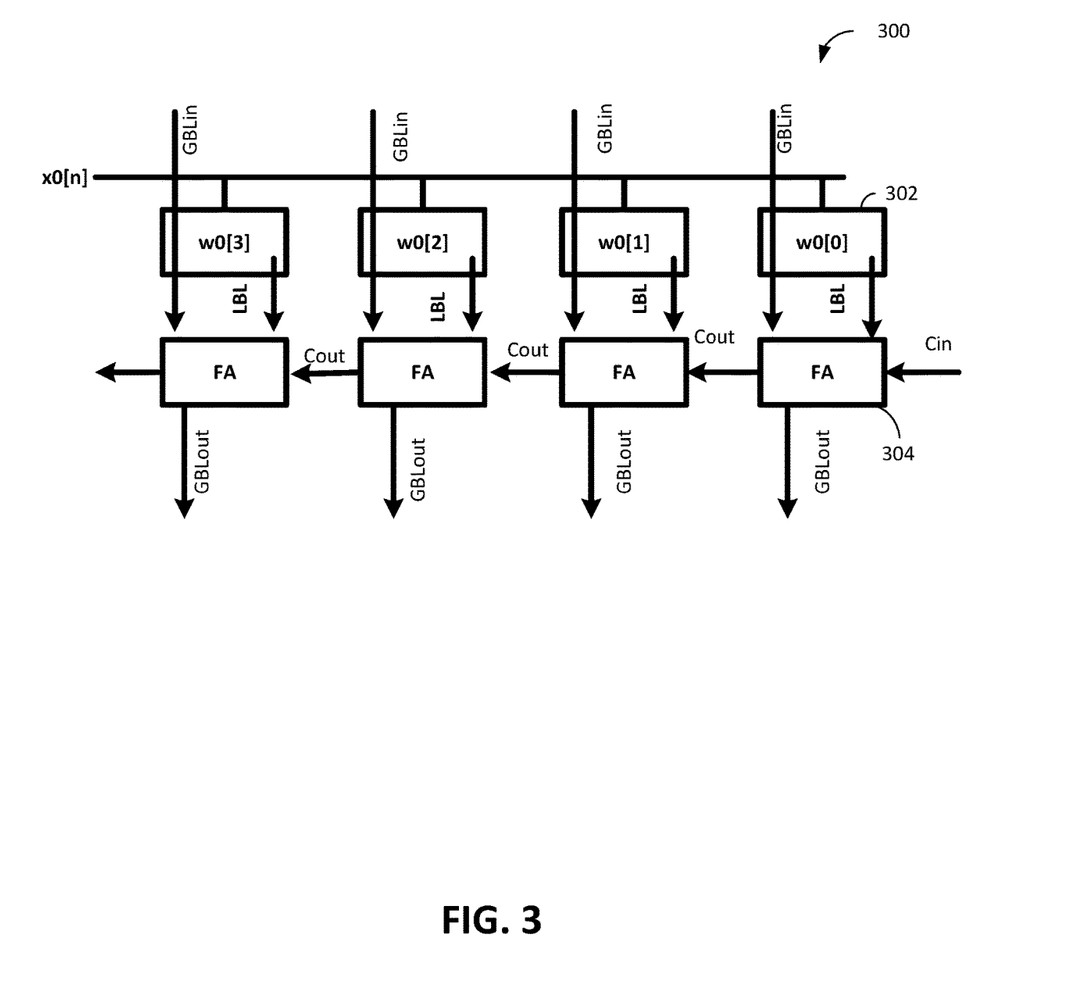
FIG. 3 illustrates four one-bit full adder cells and four SRAM cells in one row of the sub-array of SRAM cells shown in FIG. 2.

FIG. 3 illustrates four one-bit digital full-adder cells 304 and four SRAM cells 302 in one row 300 of the sub-array of memory cells 202 shown in FIG. 2. The layout of the digital full-adder cell 304 is optimized to reduce the transition space required between the digital full-adder cell 304 and the SRAM cell 302. Each digital full-adder cell 304 is modified to be pitch-aligned with a SRAM cell 302. For example, in an embodiment, the local bit line (LBL) is routed in a "lower" metal layer close to the substrate of a semiconductor device, and the global bit line (GBL) is routed over the SRAM cells 302 in a "higher" metal layer that is, a metal layer further from the substrate than the "lower" metal layer.

A one-bit full-adder adds three one-bit numbers. Each one-bit full adder 304 in FIG. 3 adds two one-bit operands, and a one-bit input carry bit from the previous less-significant stage in a multi-bit full-adder and produces a one-bit output carry and a one-bit sum.

Figure 4:
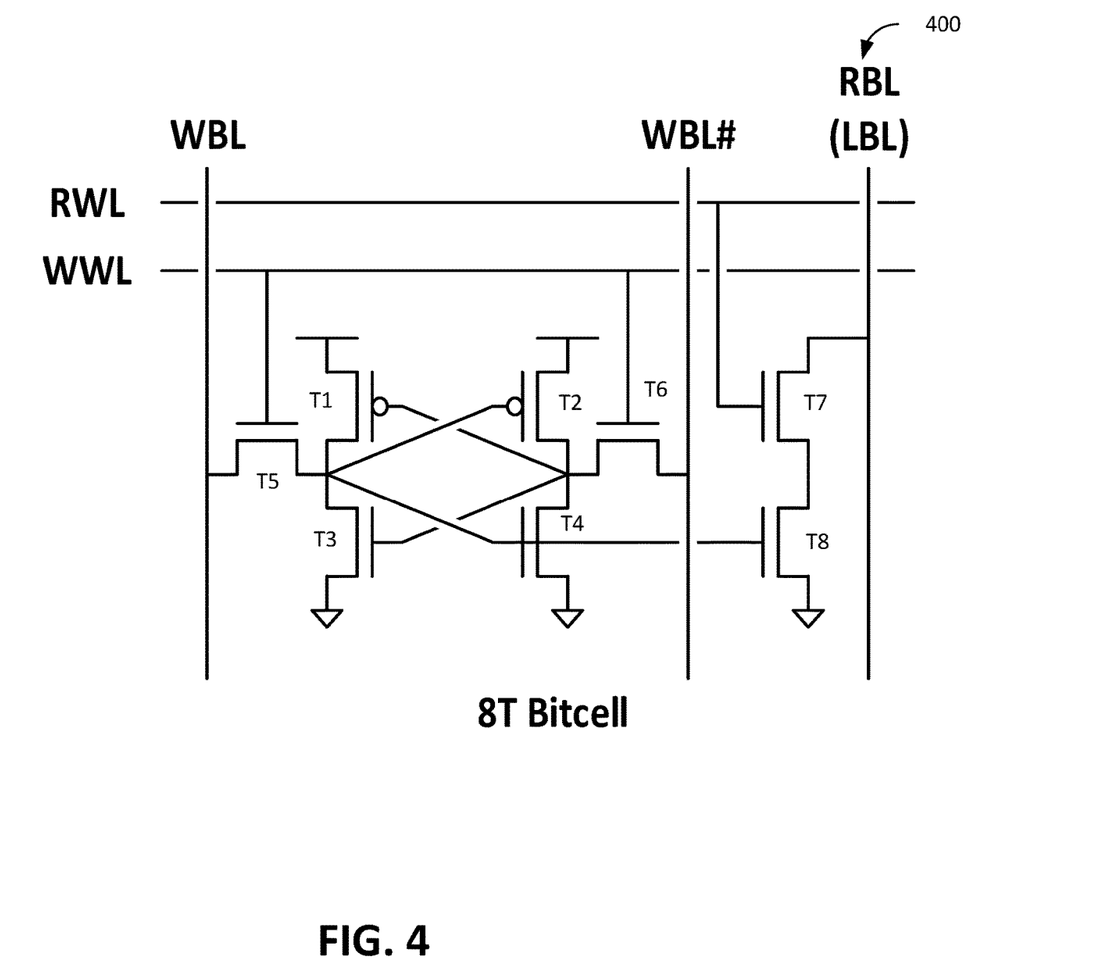
FIG. 4 is an embodiment of an 8 transistor (8T) SRAM cell.

FIG. 4 is an embodiment of an 8 transistor (8T) SRAM cell 400. Each transistor may be a metal-oxide-semiconductor field-effect transistor (MOSFET). Transistors T1, T2, T5 and T6 are N-channel MOSFET (NMOS) transistors and transistors T3, T4, T7 and T8 are P-channel MOSFET (PMOS) transistors. Each bit in the 8T SRAM cell 400 is stored in a storage cell comprising four transistors (T1, T2, T3, T4) that form two cross-coupled inverters. The storage cell has two stable states which are used to store a logic 0 or logic 1.

Four additional access transistors T5, T6, T7 and T8 control access to the storage cell during read and write operations. The access transistors T5 and T6 are turned on whenever a write word line (WWL) is activated for a write operation, connecting the 8T SRAM cell 400 to the complementary write bit lines (WBL, WBL #). When the word line is not activated, the access transistors T5 and T6 are turned off and the data is retained in the storage cell while power is applied to the 8T SRAM cell 400.

The read noise margin of the 8T SRAM cell 400 is enhanced by isolating the read and write operation. Transistors T7, T8 provide a separate channel for reading the stored data from the storage cell by activating a read word line (RWL) to turn on transistor T7 to connect the storage cell to a single ended read bit line (RBL) (local bit line (LBL)).

Figure 5:
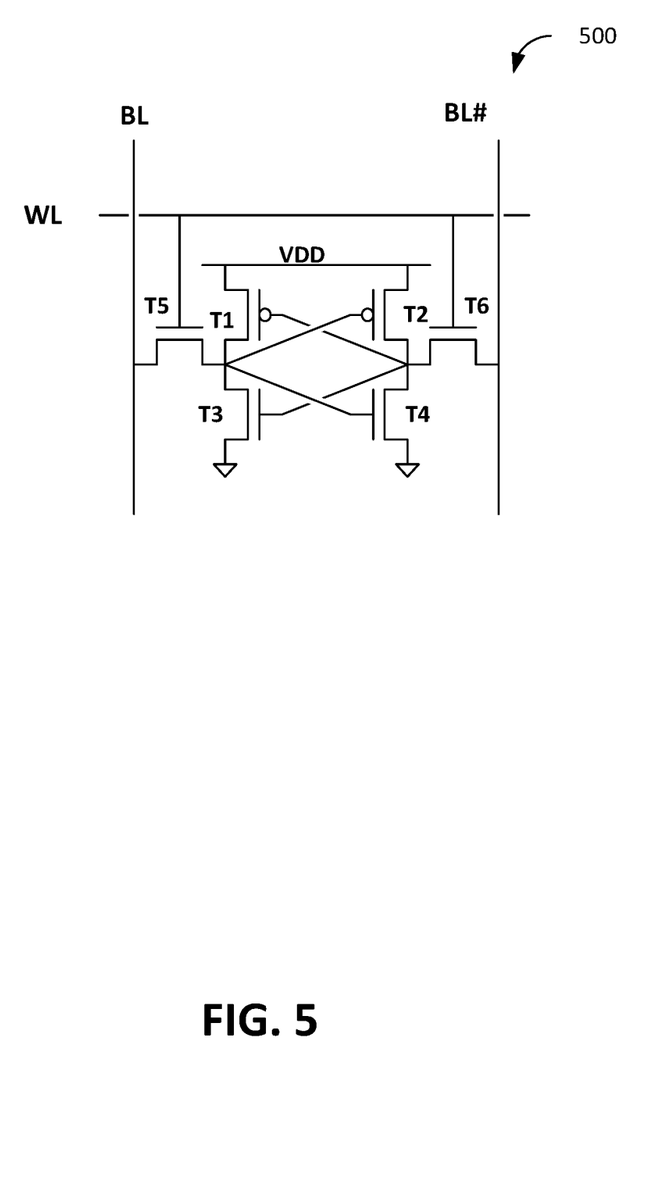
FIG. 5 is an embodiment of a six transistor (6T) SRAM cell.

FIG. 5 is an embodiment of a six transistor (6T) SRAM cell 500. Each transistor may be a metal-oxide-semiconductor field-effect transistor (MOSFET). Transistors T1 and T2 are P-channel MOSFET (NMOS) transistors and transistors T3, T4, T5 and T6 are N-channel MOSFET (PMOS) transistors. Each bit in the 6T SRAM cell 500 is stored in a storage cell comprising four transistors (T1, T2, T3, T4) that form two cross-coupled inverters. The storage cell has two stable states which are used to store a logic 0 or logic 1.

Two additional access transistors T5 and T6 control access to the storage cell during read and write operations. The access transistors T5 and T6 are turned on whenever a word line (WL) is activated for read or write operation, connecting the storage cell to the complementary bit lines (BL, BL #). When the word line is not activated, the access transistors T5 and T6 are turned off and the data is retained in the storage cell while power is applied to the 6T SRAM cell 500.

In an embodiment that includes the 6T SRAM cell 500, a sense amplifier (not shown) converts the local bit line voltage to a full-swing signal. The 6T SRAM cell 500 incurs an area trade-off and may be less area efficient than 8T SRAM cell 400 depending on the process technology. In another embodiment, an SRAM cell may have 10, 12 or more transistors per memory cell (bit).

Figure 6:
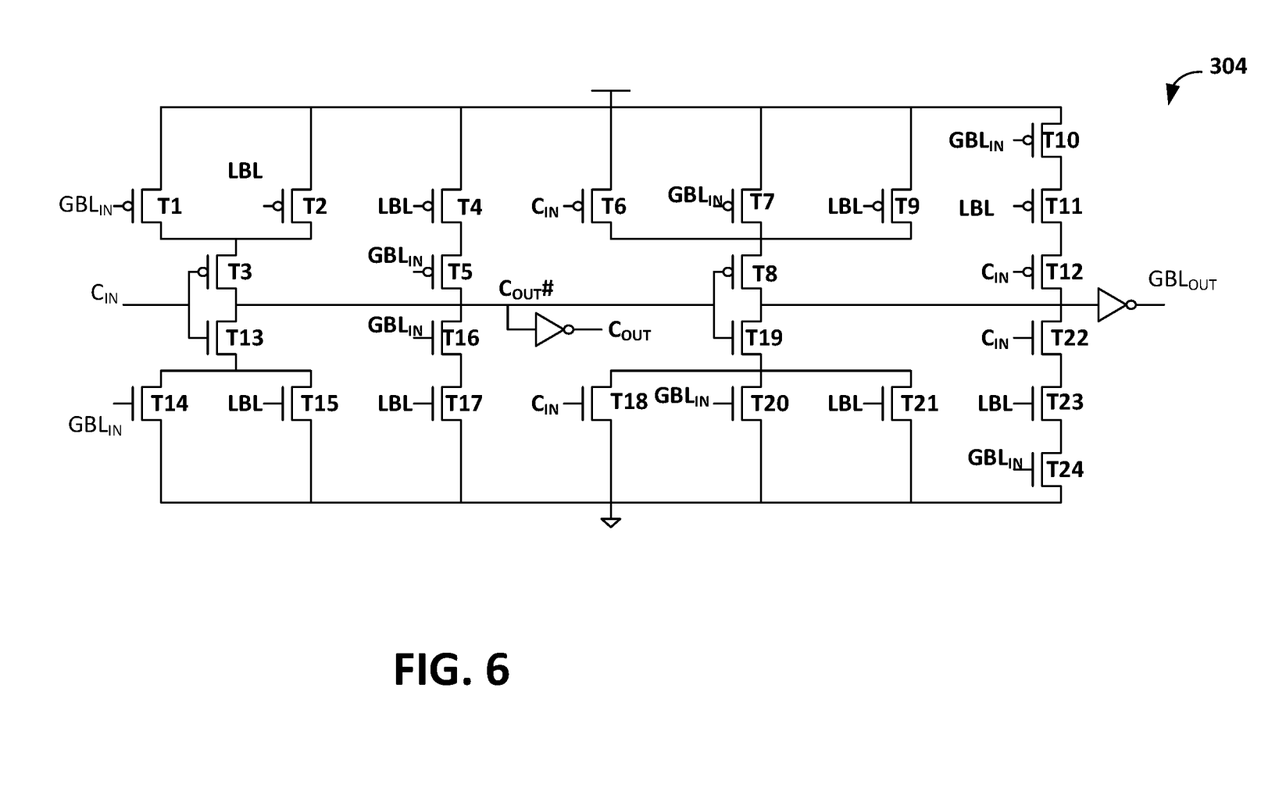
FIG. 6 is an embodiment of any one of the digital full-adder cells shown in FIG. 2.

FIG. 6 is an embodiment of any one of the digital full-adder cells 304 shown in FIG. 3. The digital full-adder cell 304 shown in FIG. 6 is a mirror adder with 24 transistors T1-T24. The PMOS transistor circuit with PMOS transistors T1-T12 and the NMOS transistor circuit with NMOS transistors T13-T24 are symmetrical.

The full adder includes two half-adders, a first half-adder to compute the carry out (Cout) and a second half-adder to compute the sum (GBLout) as shown below for two operands (A, B):

GBLout=GBLin⊕LBL⊕Carry In

Carry Out=(GBLin⊕LBL) Carry In+GBLinLBL

Figure 7:
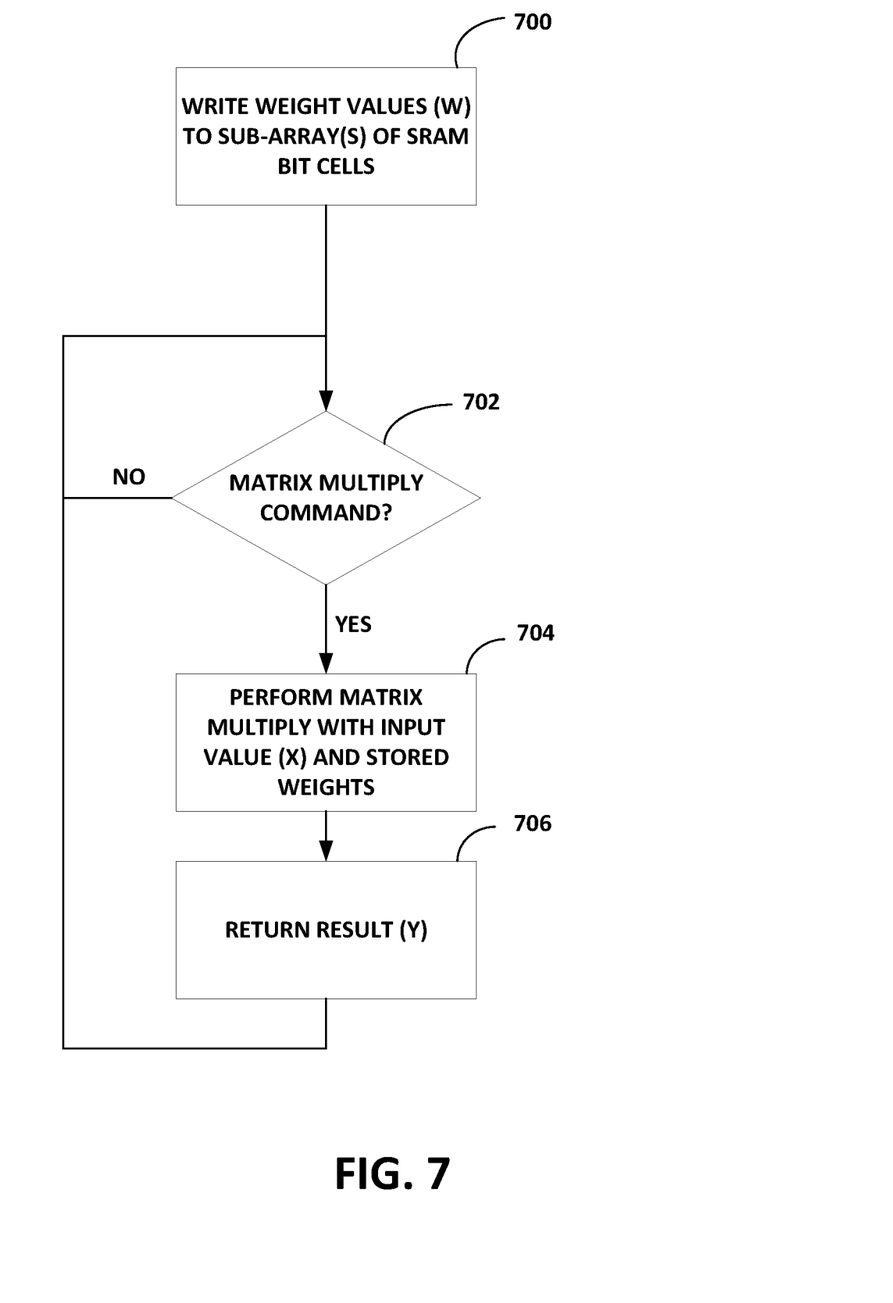
FIG. 7 is a flow graph of a matrix multiplication performed in memory.

FIG. 7 is a flow graph of a matrix multiplication performed in memory 200.

At block 700, a matrix of weight values for a matrix multiply operation are stored in the memory 200 prior to initiating a matrix multiply operation. As discussed earlier the matrix of weight values may be stored in a sub-array of memory cells 202 in memory 200. Processing continues with block 702.

At block 702, to execute a matrix multiply instruction using the weights stored in the sub-array of memory cells 202 in memory 200, an input vector X is received by the memory 200 for the matrix multiply, processing continues with block 704 to perform the matrix multiply. If a matrix multiply instruction is not to be performed, processing continues with block 702. At block 704, a matrix multiply operation is performed using the matrix of weight values stored in the sub-array of memory cells 202 in the memory 200, the digital full-adder circuit 208 and the input vector X that is stored in the memory 200. Multiplication of input activation on a word line and a weight stored in the sub-array of memory cells 202 in memory 200 is calculated through access to the sub-array of memory cells 202 in memory 200. The digital full-adder circuit 208 accumulates partial sums of multiplications within the sub-array of memory cells 202. Processing continues with block 704.

At block 706, the result vector Y of the matrix multiply operation performed in memory 200 using input vector X and the matrix of weight values stored in memory 200 is returned to the processor. Processing continues with block 702.

Figure 8:
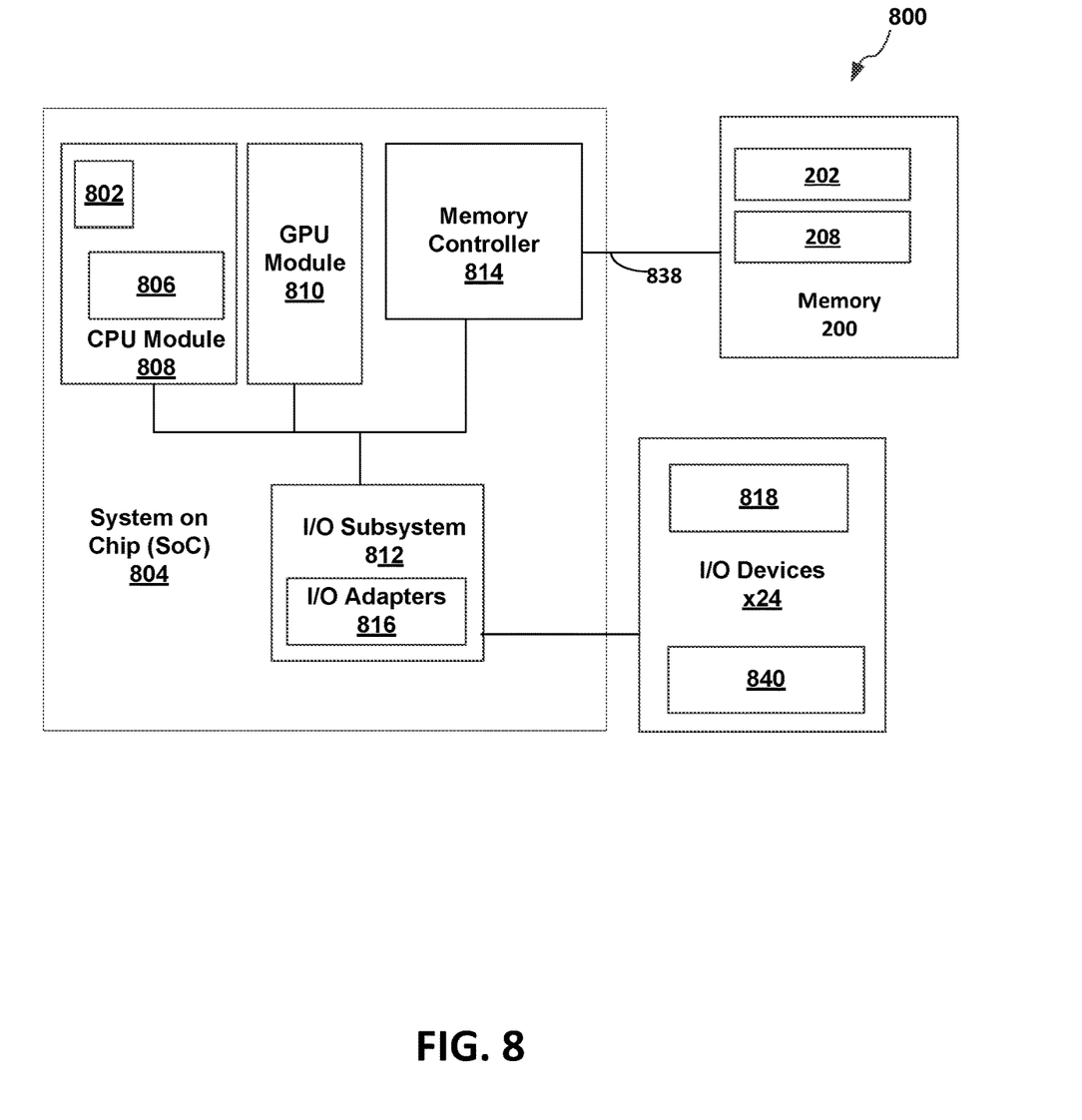
FIG. 8 is a block diagram of an embodiment of a computer system that includes the memory device that includes a digital full-adder circuit between sub-arrays of memory cells discussed in conjunction with FIG. 2.

FIG. 8 is a block diagram of an embodiment of a computer system 800 that includes the memory device that includes a digital full-adder circuit between sub-arrays of memory cells discussed in conjunction with FIG. 2. Computer system 800 may correspond to a computing device including, but not limited to, a server, a workstation computer, a desktop computer, a laptop computer, and/or a tablet computer.

The computer system 800 includes a system on chip (SOC or SoC) 804 which combines processor, graphics, memory, and Input/Output (I/O) control logic into one SoC package. The SoC 804 includes at least one Central Processing Unit (CPU) module 808, a memory controller 814, and a Graphics Processor Unit (GPU) 810. In other embodiments, the memory controller 814 may be external to the SoC 804. Although not shown, each of the processor core(s) 802 may internally include one or more instruction/data caches, execution units, prefetch buffers, instruction queues, branch address calculation units, instruction decoders, floating point units, retirement units, etc. The CPU module 808 may correspond to a single core or a multi-core general purpose processor, such as those provided by Intel® Corporation, according to one embodiment.

The Graphics Processor Unit (GPU) 810 may include one or more GPU cores and a GPU cache which may store graphics related data for the GPU core. The GPU core may internally include one or more execution units and one or more instruction and data caches. Additionally, the Graphics Processor Unit (GPU) 810 may contain other graphics logic units that are not shown in FIG. 8, such as one or more vertex processing units, rasterization units, media processing units, and codecs.

Within the I/O subsystem 812, one or more I/O adapter(s) 816 are present to translate a host communication protocol utilized within the processor core(s) 802 to a protocol compatible with particular I/O devices. Some of the protocols that adapters may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 816 may communicate with external I/O devices 824 which may include, for example, user interface device(s) including a display and/or a touch-screen display 840, printer, keypad, keyboard, communication logic, wired and/or wireless, storage device(s) including hard disk drives ("HDD"), solid-state drives ("SSD") 818, removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

In an embodiment, the memory 826 is external to the SoC 804. In other embodiments, the memory 826 may be included in the SoC 804. The memory 200 includes a sub-array of memory cells 202 and a digital full-adder circuit 208. In other embodiments, the SRAM 834 may be a byte addressable Dynamic Random Access Memory (DRAM) or a byte addressable non-volatile memory such as a byte-addressable write-in-place three dimensional crosspoint memory device, or other byte addressable write-inplace non-volatile memory devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

An operating system x42 is software that manages computer hardware and software including memory allocation and access to I/O devices. Examples of operating systems include Microsoft® Windows®, Linux®, iOS® and Android®.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A memory device comprising:
   an array of memory cells having a plurality of sub-arrays of memory cells to store weights for a neural network; and
   a digital full-adder circuit between sub-arrays of memory cells in the memory device, the digital full-adder circuit to accumulate partial sums of multiplications of an input activation vector element and the stored weights within a sub-array of memory cells.

2. The memory device of claim 1, wherein the sub-array of memory cells includes a plurality of word lines, multiplication of the input activation vector element on one of the plurality of word lines and a weight stored in the sub-array of memory cells to be computed through access to the sub-array of memory cells.

3. The memory device of claim 1, wherein the digital full-adder circuit to accumulate m 1-bit by n-bit multiplications.

4. The memory device of claim 3, wherein m is 32 and n is 8.

5. The memory device of claim 1, wherein each memory cell in the array of memory cells is a static random access memory cell.

6. The memory device of claim 5, wherein each memory cell in the plurality of sub-arrays of memory cells has eight transistors.

7. The memory device of claim 1, wherein each memory cell in the array of memory cells is a register file cell.

8. The memory device of claim 1, wherein the digital full-adder circuit is a mirror adder.

9. The memory device of claim 1, wherein each memory cell in the array of memory cells is a byte-addressable write-in-place three dimensional crosspoint memory cell.

10. A method comprising:
    storing weights for a neural network in a plurality of sub-arrays of memory cells in an array of memory cells in a memory device; and
    accumulating partial sums of multiplications of an input activation vector element and the stored weights within a sub-array of memory cells in a digital full-adder circuit between sub-arrays of memory cells in the memory device.

11. The method of claim 10, further comprising:
    computing multiplication of the input activation vector element on one of a plurality of word lines and a weight stored in the sub-array of memory cells through access to the sub-array of memory cells.

12. The method of claim 10, wherein the digital full-adder circuit to accumulate m 1-bit by n-bit multiplications.

13. The method of claim 12, wherein m is 32 and n is 8.

14. The method of claim 10, wherein each memory cell in the array of memory cells is a static random access memory cell.

15. The method of claim 10, wherein each memory cell in the array of memory cells is a register file cell.

16. A system comprising:
a processor; and
a memory device communicatively coupled to the processor, the memory device comprising:
an array of memory cells having a plurality of sub-arrays of memory cells to store weights for a neural network; and
a digital full-adder circuit between sub-arrays of memory cells in the memory device, the digital full-adder circuit to accumulate partial sums of multiplications of an input activation vector element and the stored weights within a sub-array of memory cells.

17. The system of claim 16, wherein the sub-array of memory cells includes a plurality of word lines, multiplication of the input activation vector element on one of the plurality of word lines and a weight stored in the sub-array of memory cells to be computed through access to the sub-array of memory cells.

18. The system of claim 16, wherein the digital full-adder circuit to accumulate m 1-bit by n-bit multiplications.

19. The system of claim 18, wherein m is 32 and n is 8.

20. The system of claim 16, wherein each memory cell in the array of memory cells is a static random access memory cell.

\* \* \* \* \*